(12) United States Patent
Kirkpatrick et al.

(10) Patent No.: US 7,324,207 B1
(45) Date of Patent: Jan. 29, 2008

(54) OPTICAL PULSE CORRELATOR HAVING AN INTERFEROMETER ARRAY

(75) Inventors: Sean Kirkpatrick, Stone Ridge, VA (US); Ali A. Said, Ann Arbor, MI (US); Mark Allen Dugan, Ann Arbor, MI (US); Thomas Sosnowski, Pickney, MI (US); Philippe Bado, Ann Arbor, MI (US)

(73) Assignee: Translume, Inc., Ann Arbor, MI (US)

( * ) Notice: Subject to any disclaimer, the term of this patent is extended or adjusted under 35 U.S.C. 154(b) by 278 days.

(21) Appl. No.: 11/112,245

(22) Filed: Apr. 22, 2005

Related U.S. Application Data (60) Provisional application No. 60/566,645, filed on Apr. 30, 2004.

(51) Int. Cl.
*G01B 9/02* (2006.01)

(52) U.S. Cl. ......................... 356/478; 385/12
(58) Field of Classification Search ............... 356/477, 356/478, 484, 491; 385/12
See application file for complete search history.

(56) References Cited

U.S. PATENT DOCUMENTS

| | | | | |
|---|---|---|---|---|
| 4,173,442 A | * | 11/1979 | Snyder | 356/454 |
| 4,747,688 A | * | 5/1988 | Geary | 356/477 |
| 4,779,984 A | * | 10/1988 | Cook | 356/451 |
| 5,359,412 A | * | 10/1994 | Schulz | 356/478 |
| 5,555,086 A | * | 9/1996 | vonBieren et al. | 356/478 |
| 5,611,007 A | * | 3/1997 | Wolf et al. | 385/14 |
| 6,111,679 A | * | 8/2000 | Fishman | 398/82 |
| 6,768,850 B2 | | 7/2004 | Dugan | |
| 6,956,653 B1 | * | 10/2005 | Lam et al. | 356/477 |

OTHER PUBLICATIONS

U.S. Appl. No. 10/676,972, filed Sep. 30, 2003, Said.
Jerome Paye, "How to measure the amplitude . . . ", IEEE J. Quantum Electronics, vol. 30, p. 2693-2697, 1994.
I. Schannen et al., "new integrated-optics interferometer . . . " Applied Optics, vol. 33, p. 5954-5958, 1994.
F. Malbet et al., "Integrated optics for astronomical interferometry", Astronomy & Astrophysics Supplement Series, vol. 138, p. 135-145, 1999.
J.-P. Berger, "Combining up to eight . . . ", Proceedings of SPIE, vol. 4006, p. 986, 2000.
F. Rooms et al., "Design of three telescopes interferometer . . . ", Proceedings of SPIE, vol. 4640, p. 246-254, 2002.

* cited by examiner

*Primary Examiner*—Tarifur Chowdhury
*Assistant Examiner*—Jonathan M Hansen (57) ABSTRACT

An optical device is useful for analyzing an optical signal pulse to determine information related to the pulse, such as information related to its temporal coherence length. The optical device generally includes a plurality of interferometric devices to generate one or more respective interference patterns from the optical signal pulse, and a plurality of detectors associated with each respective interferometric device to receive the one or more respective interference patterns. At least one of the plurality of interferometric devices is disposed in a glass substrate. The optical device may be integrated in an optical correlation system having an analyzer coupled to the plurality of detectors to determine the temporal coherence length or other pulse-related information for the optical signal pulse based on the received interference patterns.

25 Claims, 5 Drawing Sheets

OPTICAL PULSE CORRELATOR HAVING AN INTERFEROMETER ARRAY

RELATED APPLICATION

This application claims the benefit of provisional application Ser. No. 60/566,645, filed on Apr. 30, 2004, and entitled "Optical Pulse Correlator Having an Interferometer Array."

This invention was made in the performance of a Cooperative Research and Development Agreement with the Department of the Air Force. The Government of the United States has certain rights to use the invention.

BACKGROUND OF THE INVENTION

1. Field of the Invention

The disclosure relates generally to optical pulse correlation and other temporal measurements and, more specifically, to devices capable of determining the temporal coherence length, center wavelength, and bandwidth of a known or unknown incident optical pulse.

2. Brief Description of Related Technology

Short optical pulses, such as pulses having a pulse duration of less than tens of picoseconds, are typically too short for electronic detection techniques. Standard optoelectronic measurement techniques may fail to have the necessary temporal resolution. One exception involves the use of streak cameras, but such devices are expensive, bulky, and generally not compatible with field-use applications. Resort to optical detection schemes have relied on autocorrelation techniques involving non-linear devices that are complex, non-integrated, wavelength-dependent, and burdened by moving parts. Moreover, optical detection schemes have often been disfavored due to the recognition that the autocorrelation techniques typically require the incident pulses to be near Fourier-transform limited.

As a result of the foregoing complications, pulse duration measurements and other analysis of short optical pulses are rarely performed in the field.

SUMMARY OF THE DISCLOSURE

In accordance with one aspect, an optical device useful for analyzing an optical signal pulse includes a glass substrate, a plurality of unbalanced interferometric devices to generate one or more respective interference patterns from the optical signal pulse, and a plurality of detectors associated with each respective interferometric device to receive the one or more respective interference patterns to determine information related to the optical signal pulse. At least one of the plurality of interferometric devices is disposed in the glass substrate.

In one embodiment, each interferometric device includes a time-delay section comprising two waveguides having a path length difference. The time-delay section of the interferometric device disposed in the glass substrate may include a three-dimensional waveguide path disposed in a bulk of the glass substrate.

In some embodiments, each interferometric device of the plurality of interferometric devices is disposed in the glass substrate.

The optical device may further include an analyzer responsive to whether each interferometric device in the plurality of interferometric devices generates an interference pattern such that the information related to the optical signal pulse includes temporal coherence length data for the optical signal pulse. The optical device may still further include a demultiplexer that distributes the optical signal pulse to each interferometric device of the plurality of interferometric devices. The demultiplexer and each interferometric device of the plurality of interferometric devices may be integrated and disposed in the glass substrate. The analyzer may include a controller that generates a control signal for the demultiplexer to allocate power associated with the optical signal pulse to one or more interferometric devices of the plurality of interferometric devices.

In one embodiment, the optical device further includes a plurality of output optics modules for the plurality of interferometric devices, respectively, wherein the pluralities of output optics modules and interferometric devices are integrated and disposed in the glass substrate, such that the interference patterns are generated at or near a surface of the glass substrate. Each output optics module may include a three-dimensional region that has a height approximately equal to a cross-sectional dimension of a waveguide portion of the respective interferometric device terminating at the three-dimensional region. Each output optics module may also include a three-dimensional portion of the glass substrate having a modified refractive index.

In accordance with another aspect, an optical pulse correlation system for analyzing an optical signal pulse includes a glass substrate, an interferometer array of interferometric elements wherein each interferometric element of the interferometer array includes a waveguide that introduces a respective time delay for autocorrelation of the optical signal pulse, a plurality of detectors in optical communication with the interferometer array to receive one or more interference patterns generated by the interferometer array, and an analyzer coupled to the plurality of detectors to determine temporal coherence length information for the optical signal pulse based on the received interference patterns. At least one interferometric element of the interferometer array is disposed in the glass substrate.

In one embodiment, the temporal coherence length information determined by the analyzer includes data that brackets the temporal coherence length of the optical signal pulse based on two interferometric elements of the interferometer array having time delays near the temporal coherence length of the optical signal pulse. The analyzer may further determine temporal pulse length information when the optical signal pulse is Fourier-transform limited. The time delay of the interferometric device disposed in the glass substrate is introduced by a three-dimensional waveguide path disposed in a bulk of the glass substrate.

In accordance with yet another aspect, a method of determining information related to an optical signal pulse includes (i) distributing the optical signal pulse to a plurality of interferometric devices, each of which having a pair of waveguide arms that introduces a respective delay via a predetermined, respective path length difference between the pair of waveguide arms; and (ii) analyzing one or more interference patterns generated by the plurality of interferometric devices to determine the optical signal pulse information.

In one embodiment, the analyzing step includes processing one or more interference patterns using an autocorrelation algorithm such that the information includes data related to a temporal coherence length of the optical signal pulse. The analyzing step may include determining whether each interferometric device of the plurality of interferometric devices generates an interference pattern to bracket a temporal coherence length of the optical signal pulse.

In some cases, each interferometric device of the plurality of interferometric devices may be disposed in a glass substrate. The distributing step may then include splitting the optical signal pulse using waveguide structures disposed in the glass substrate and integrated with the plurality of interferometric devices. The splitting step may include controlling a power distribution of the optical signal pulse. The analyzing step may include detecting one or more interference patterns using a plurality of detectors disposed on one or more surfaces of the glass substrate.

In another embodiment, the method further includes the step of detecting an arrival of the optical signal pulse. The analyzing step may include processing one or more interference patterns to generate data indicative of a central wavelength of the optical signal pulse.

In accordance with yet another aspect, an optical signal pulse analysis method includes distributing an optical signal pulse to a plurality of unbalanced interferometric devices, each of which having a fixed path length difference, and analyzing an interference pattern generated by at least one of the plurality of unbalanced interferometric devices to determine discretized pulse information related to a temporal coherence length of the optical signal pulse and based on the respective fixed path length difference.

DETAILED DESCRIPTION OF PREFERRED EMBODIMENTS

This disclosure describes a device for measuring the pulse duration, center wavelength, and bandwidth of an incident optical pulse, within the measurement range and resolution of an application specific designed device, using an integrated, non-moving autocorrelation technique. To that end, described herein are optical or photonic devices and systems having an array of unbalanced interferometers integrated for temporal correlation and other measurements and analysis in connection with short optical pulses. The disclosed devices and systems may be used in a number of autocorrelation applications, including the analysis of very short optical signals (e.g., femtosecond or sub-500 picosecond pulse lengths) having unknown optical characteristics. The temporal coherence length (or correlation length) of the optical pulses is determined using an integrated photonic device, including the interferometer array, such that the coherence length may be determined without knowledge of other characteristics of the optical pulses or the source thereof, such as wavelength or polarization state.

More particularly, the interferometer array includes a plurality of Young's interferometers having unbalanced pairs of interference paths. Each Young's interferometer and its respective unbalanced pair of paths generate an interference pattern (or lack thereof) that may be analyzed to derive information related to the coherence length of the optical pulses. Because each unbalanced pair of paths is fixed, certain information related to the optical pulses may be generated in a discretized manner. For example, the information derived from the plurality of Young's interferometers may determine a range or bracket of possible coherence lengths for the optical pulses received or detected by the device or system. In certain applications, pulse duration, bandwidth, and wavelength information (e.g., the central wavelength of the pulse) may then be generated or extracted from the coherence length information.

The disclosed devices and systems are also well suited for application and operation in demanding or harsh environments and other field uses. The robust nature of the disclosed devices and systems is due in part to the disposition of the photonic device and possibly other aspects of the device or system, such as input and output optics, in a glass substrate such as fused silica. Waveguides and other structures in glass substrates or blocks provide several advantages, including high thermal and vibration stability, size flexibility, and the opportunity for three-dimensional structures. For instance, the need to fabricate interferometric structures incorporating about 100 ps of delay requires a very long waveguide and, accordingly, a lot of space. Silicon-based and other planar substrate devices are typically limited to device structures on or near a single surface and, as such, would be excessively costly in such circumstances. In contrast, utilization of the entire three-dimensional glass block can provide a compact, efficient photonic device layout, notwithstanding the high degree of device integration and complexity.

The interferometer array approach also avoids operational complications raised by alternative spectrographic measurement instruments that may, for instance, introduce a variable optical delay. The generation of variable optical delays may involve moving parts and other complex components that may fail during extended or extreme field use.

In certain embodiments, the robustness of the disclosed device and system is also based on the manufacture of an entire interferometric micro-device array in a single, monolithic block of glass. Further operational and other advantages are gained by such an integrated set of interferometric photonic micro-devices for autocorrelation or temporal coherence measurements. The micro-devices may be further integrated with some or all of any other optical and photonic devices or components supporting such measurements.

Still further operational and other advantages are gained by the manner in which the photonic device and other components of the disclosed system are fabricated in the glass block or substrate. The embodiments described herein below take advantage of the direct-write capability of ultrashort pulsed lasers (e.g., laser pulses below 1 picosecond in duration). Generally speaking, waveguides and other structures are directly written or fabricated in a glass substrate via localized modification of the refractive index due to non-linear absorption of the laser pulses. Lasers suitable for generating ultrashort pulses are generally available from a number of companies and other sources, including Coherent, Inc. (Santa Clara, Calif.) under the trade name "RegA" and Spectra Physics (Mountain View, California) under the trade name "Tsunami." Such ultrashort pulsed lasers can typically achieve pulse widths of less than 100 femtoseconds. Direct-writing within an optical material, such as fused silica, may be achieved with pulse energies of nano-Joules to several micro-Joules depending on the pulse widths as well as focusing optics.

Ultrashort laser pulses are capable of writing waveguides and other structures in the bulk of the glass substrate or block, as opposed to only at or near a surface. In this way, directly written waveguides are not nearly as spatially limited as waveguides fabricated using other techniques, such as ion diffusion, and may include three-dimensional structures such as coils such that one or more portions of a waveguide may have a three-dimensional path.

Further details regarding the use of ultrashort laser pulses for photonic device fabrication may be found in the U.S. patent entitled "Method of Index Trimming a Waveguide and Apparatus Formed of the Same" (U.S. Pat. No. 6,768,850—dated 27 Jul., 2004) and the U.S. patent application entitled "Waveguide Fabrication Methods and Devices" (Ser. No. 10/676,972, filed 30 Sep. 2003), the specifications of which are hereby incorporated by reference.

Figure 1:
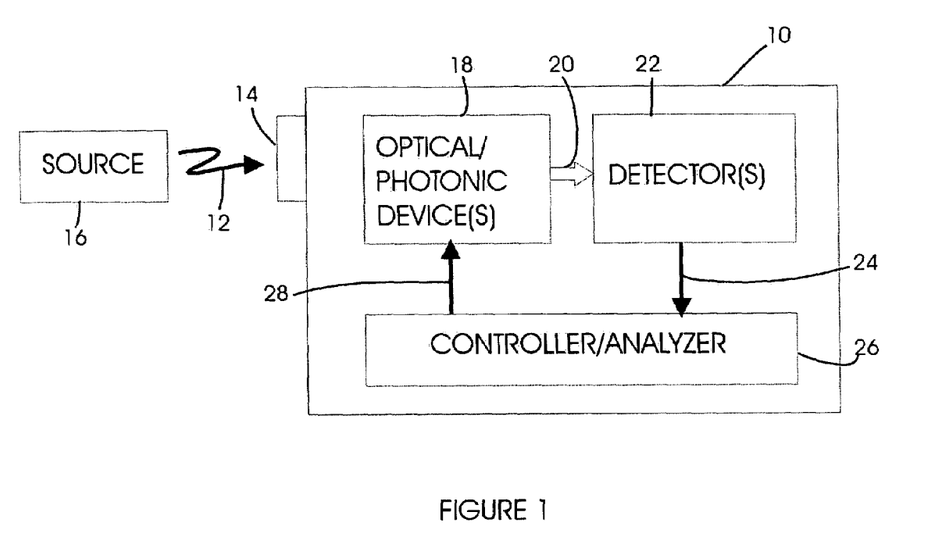
FIG. 1 is a schematic block diagram of a short optical pulse autocorrelation system in accordance with one embodiment.

With reference now to FIG. 1, an optical pulse correlation system 10 receives an optical signal 12 via collection or relay optics 14, such as a lens and/or other standard reception or collection techniques and equipment for the field use or application known to those skilled in the art. The received signal 12 is generally composed of one or more pulses of unknown characteristics, as a source 16 of the signal 12 may also be unknown. More particularly, the signal 12 may be transmitted at an unknown wavelength and polarization state. In certain applications, the pulses of the signal 12 may be very short, such as less than 500 picoseconds in pulse duration. In such and other cases, the system 10 provides a robust, integrated, optical solution for generating information related to the temporal coherence length (or temporal correlation length), pulse duration and wavelength of the signal 12.

The correlation system 10 includes a collection 18 of optical and/or photonic devices for processing the signal 12 prior to supplying a set 20 of optical signals to a detector 22. The optical and photonic devices may be integrated to varying degrees, as may be necessary or advantageous for a particular application or field use. The device collection 18 generally includes an array of interferometric micro-devices along with any optical and other components necessary for handling the optical pulses of the signal 12. The detector 22 may include a plurality of charge-coupled detectors (CCDs), a CMOS detector, or some other standard detector technology known to those skilled in the art for converting the processed optical signal set 20 to electrical data signals 24, which are provided to a controller or analyzer 26. The data 24 is generally representative of a number of interference patterns respectively generated by the array of interferometric micro-devices. Such interference pattern data 24 may be processed or analyzed by controller 12 via appropriate software, hardware or firmware running standard autocorrelation and other algorithms to generate information related to the aforementioned characteristics of the received optical signal 12.

The array of interferometric micro-devices operates in collective fashion as an autocorrelator to provide information related to the spectrum of the signal 12, or the temporal coherence length of the pulses. For example, if an interferometer within the array has a 1 picosecond delay, application of the pulses of the received signal 12 to that interferometer will provide information as to whether the coherence length was longer or shorter than 1 picosecond. If an interference pattern is generated, the coherence length of the received signal is longer or equal to 1 picosecond. No resulting interference pattern means that the coherence length was shorter (or be indicative of a lack of a received signal). Another interferometer within the array may then be used to bracket the coherence length such that the temporal coherence length is determined to lie within the two numbers corresponding with the two delays introduced in the two interferometers, respectively.

Such coherence length information may provide additional characteristics of the received pulses, the accuracy, precision and/or resolution of which increases with the degree to which the received pulses are time-bandwidth limited (or Fourier transform limited). More particularly, information related to the bandwidth and center wavelength of the pulses may be extracted from the measured interference pattern. Such information improves with increasingly time-bandwidth limited pulses. That is, as the received pulses approach the theoretically shortest bandwidth to transmit a given pulse, the disclosed device and system will generate increasingly accurate and precise pulse duration information regarding the received pulses. See herein below for the theoretically derived relationship between the interference pattern derived via the disclosed device and method and bandwidth, center wavelength, and pulse width. Given that the center frequency in Fourier space can be calibrated on the device, and that the individual interferometers bracket the pulse width within the device, the limit on the bandwidth can be found. Thus within a single device having several interferometers, several key parameters of an unknown incident pulse can be determined within the bounds of the temporal delay and resolution of the device.

Certain applications may involve received signals with pulses that remain transform-limited for long periods or throughout transmission. Such applications may generally include signal propagation through non-dispersive media or through nonlinear mechanisms (preserving pulse width) that do not significantly degrade pulses that were initially generated and transmitted in transform-limited fashion. Applications may, but need not, involve signal propagation through a vacuum or similar medium.

Each interferometer of the array, acting alone, provides a lower bound on the coherence length if that interferometer generates an interference pattern. If an interferometer fails to generate an interference pattern, then that interferometer provides an upper bound on the coherence length (assuming that a signal was received). Two interferometers, therefore, may bracket the coherence length when the interference patterns reveal materially different results. Without advance knowledge of the signal characteristics, the system 10 employs or integrates a large number of interferometric micro-devices to help ensure that the coherence length is bracketed with sufficient resolution as determined by the application specifications or parameters.

In one embodiment, six micro-devices or temporal correlators may be integrated such that the system 10 is capable of distinguishing between pulse durations of approximately 100 fs, 250 fs, 500 fs, 1 ps, 10 ps, and 100 ps. In another example, five correlators may be integrated into the same glass block (as described hereinbelow) optimized for temporal correlation of pulses having an approximate pulse duration of 200 fs, 1 ps, 10 ps, 100 ps, and 500 ps (with corresponding path differences of approximately 40 microns, 200 microns, 2 mm, 2 cm, and 10 cm, respectively). Taken together, all the interferometers of the array combine to bracket or bound the coherence length, thereby defining a range of coherence length values from one delay to an adjacent one. In this example, the size of the monolithic block of glass may be approximately 10 cm×15 cm×6 mm.

The controller 26 may allocate power from the received signal 12 across the various interferometers within the array to optimize performance. One or more control signals 28 generated by the controller 26 are provided to control the collection 18 of devices in this regard. Such active control of the interferometer array may, for example, provide a process-of-elimination approach to determining the pulse duration. More particularly, as pulses of a given signal are received, the controller 26 may generate a signal-division ratio that first equally distributes the signal 12 to all interferometers in the array. This ratio may be fixed or, alternatively, be variable, in which case, the control signal 28 may then be modified through user control or autonomously to reflect the changes to the ratio. For example, after the controller 26 has analyzed interference data from each interferometer in the case of equal distribution, the controller 26 adjusts the power distribution to highlight a subset of the interferometer array better suited for measurement of the received pulses. In effect, the approach allows the signal-to-noise ratio of the system to improve as the interferometers are narrowed down from the initial set to as few as one, two or three. This technique may be particularly advantageous when the application involves detection of weak signals.

In certain embodiments, electro-optical, magneto-optical, mechanical or thermo-optical mechanisms (not shown) are responsive to the control signal 28 to effect such signal-division modifications.

Figure 2:
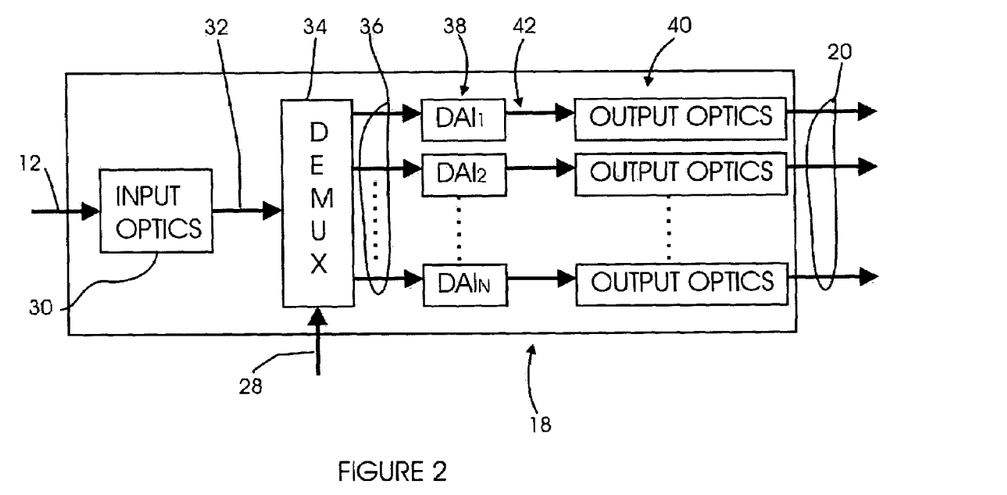
FIG. 2 is a schematic block diagram of optical and photonic devices or components of the system of FIG. 1 in accordance with another embodiment.

FIG. 2 shows the collection 18 of optical and photonic devices in greater detail. The received signal 12 is initially processed by input optics 30 that may include one or more lenses, mirrored surfaces and other structures, such as fiber, to collect and/or prepare the pulses for interferometric analysis. The system may also include a polarizer device (not shown) written or integrated in the same block or substrate as the input optics 30 and/or other components of the system. Alternatively, the polarizer may be disposed separately for receipt of a portion of the received signal. In either case, the polarizer processes the signal to create a cleaner signal for interferometric analysis. A focused or otherwise processed optical signal is generated by the input optics 30 and provided via a waveguide 32 to a demultiplexer 34 that splits the signal 32 into a set of subsidiary signals, which in turn, are respectively carried by a set 36 of waveguides to an array of Young's interferometers indicated generally at 38.

Each such Young's interferometer of the array 38 has a predetermined unbalance established via a time delay introduced therein. The unbalance is established as follows. The incoming pulse is divided into two beams. The two beams advance along optical paths S1 and S2. If t is the time for one light signal to traverse path S1 and t+delta t is the time for the other signal to traverse path S2, the two signals are then let to interfere with each other, and the amount of interference is a function of the difference, or delay, delta t. If the two beams interfere (i.e., create an interference pattern), one can assume that the temporal coherence length is longer than the delay (delta t). By varying delta t over a range starting at or near zero, one can put a lower limit on the temporal coherence length.

The interferometers will be built with various path differences to cover the range of pulse widths of interest. In one embodiment, the array 38 includes a plurality of waveguide delay and add interferometers ($DAI_1, DAI_2, \ldots DAI_N$). The terms "delay" and "add" refer to the introduction of a delay for one portion of the signal and, thereafter, the recombination of two portions of the signal to produce the interference pattern. More particularly, within each respective DAI of the array 38, the optical signal carried by a corresponding waveguide in the set 36 is generally split into two waveguide arms. A path length difference between the two arms is varied from DAI to DAI in the array 38. By varying the path length differences between respective DAIs in the array 38, each DAI is unbalanced to a different extent, thereby creating a distinctive interference pattern (or lack thereof). Variations in the interference patterns can be measured as a function of path length difference, such that each path length difference corresponds to a predetermined temporal correlation bracket. The width of optical pulses can then extracted from this interference array.

A plurality of output optics modules generally indicated at 40 process the interference pattern (or the underlying signals) generated by each respective DAI of the array 38. For example, the underlying signals or exiting beams may be collimated to increase interferometric contrast. In some embodiments, the exiting beams are allowed to propagate through free space (shown schematically at 42) prior to impacting the output optics modules 40, respectively.

Generally speaking, the foregoing components of the collection 18 of optics and photonics devices are integrated. The degree to which, and manner in which, such integration occurs may vary for different applications or field uses. For instance, each DAI of the array 38 may disposed in a single glass substrate or block. Further, the waveguides or waveguide set 36 may also be disposed in the same glass block as the DAI array 38. Still further, one or more of the demultiplexer 34, input optics 30, and the plurality of output optics modules 40 may be disposed in a single glass block, such as (but not necessarily) the same glass block as the DAI array 38.

Figure 3A:
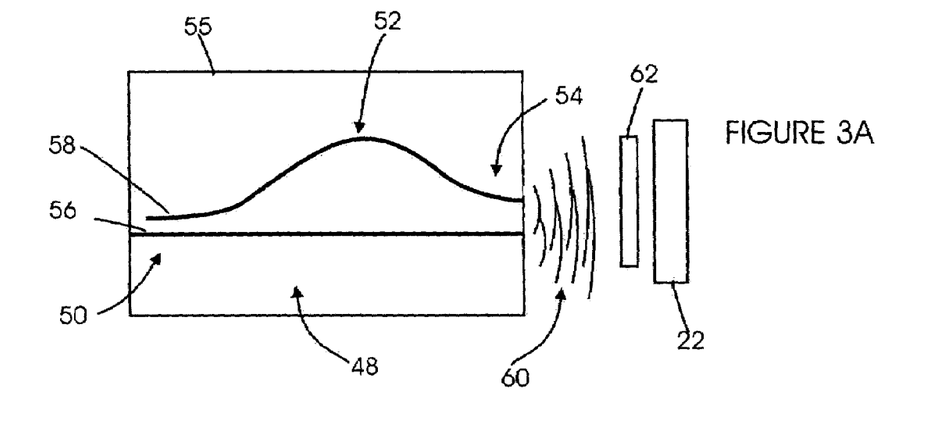
FIGS. 3A and 3B are schematic illustrations of Young's interferometers of the photonic device of FIG. 2 in accordance with further embodiments.
Figure 3B:
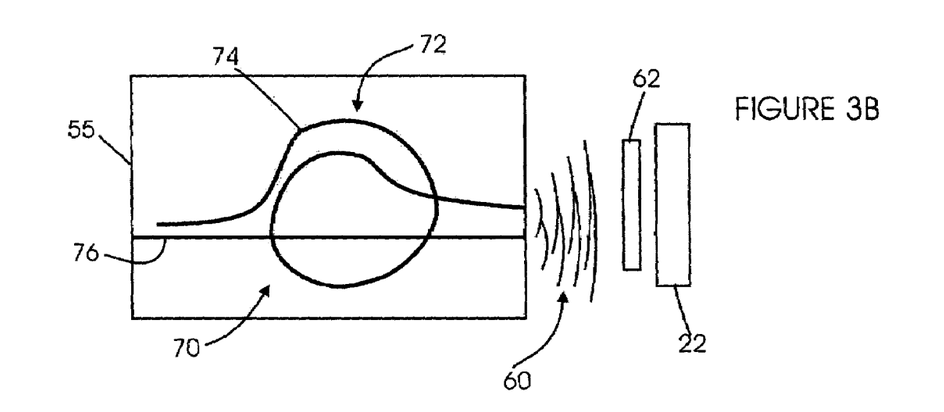

With reference now to FIGS. 3A and 3B, an interferometer in accordance with one embodiment and indicated generally at 48 includes an input section indicated generally at 50, a time delay section indicated generally at 52, and an output section indicated generally at 54. Each of the aforementioned sections of the interferometer 48 is disposed and integrated in a glass block or substrate 55. The input section 50, or optical splitter portion, may take the form of one of a number of conventional splitters. FIGS. 3A and 3B shows the splitting occurring through evanescent coupling. Other splitting techniques may employ a Y-junction, a multimode interference (MMI) device, or other splitter structures known to those skilled in the art. In any case, an input waveguide 56 forms one arm of the interferometer 48 and transfers a fraction of the signal guided thereby to a nearby waveguide 58 that forms the second, other arm of the interferometer 48. In this example, the signal traveling through the second arm experiences an added delay in the time delay section 52 effected by a waveguide path of increased length relative to the path of the waveguide 56. The delay path may include one or more bends, curves or other portions. As shown, the curves extend the waveguide 58 in two dimensions solely for purposes of convenience in illustration. Generally speaking, the waveguide may include any number of portions having a three-dimensional path.

The output section 54 is where the two waveguides or arms 56, 58 of the interferometer 48 are brought close enough together to enable interference after the end of the waveguides, but not so close so as to cause any evanescent coupling between such waveguides. Such interference is indicated schematically and generally at 60. In this embodiment, the signals or beams guided by the two arms 56, 58 are allowed to exit the glass block 55 and propagate through free space until impacting focusing or other optics such as a lens 62 prior to forming an image for detection by a CCD or other detector 22.

As explained hereinabove, respective interferometers within the array 38 have differing time delays. To that end, time delays may be manufactured by coiling one of the arms in two or three dimensions within the glass block or substrate. To illustrate an embodiment with such coiling, an interferometer indicated generally at 70 is shown in FIG. 3B. The interferometer 70 has a time delay section indicated generally at 72 that introduces a greater delay than the one shown in FIG. 3A. In this embodiment, one waveguide or arm 74 of the interferometer 70 overlaps or crosses over itself or another waveguide portion, such as another arm 76 of the interferometer 70. The terms overlap, crossover, and the like shall be understood to generally mean a crossing at different heights within the glass block or at the same height. As set forth above, the waveguide portions need not be disposed in a planar manner. Direct writing of the waveguides provides for such three-dimensional waveguide structures. More particularly, the depth of the waveguides may be adjusted simply by adjusting the focal point depth of the writing laser. Such three-dimensional writing may be particularly advantageous if the number of interference pairs and other waveguides becomes significant enough to complicate the waveguide layout in a single plane. Notwithstanding the foregoing, if, for some reason, the waveguides need to cross in the same plane or at the same height, the potential for losses or other undesirable effects at such waveguide crossovers occurring at or near the same height may be avoided by fabricating the waveguides to crossover at roughly or near right angles.

Elements shown in FIG. 3B similar to those shown in FIG. 3A are identified by like reference numerals.

In accordance with another embodiment, the various optics components at the input or output ends of each interferometer may be integrated with aspects or components of the photonic device, such as the interferometer array. For example, and with reference now to FIGS. 4A and 4B, a slab or other region 80 within the block 55 enables and controls interference within the block 55. As better shown in FIG. 4B, the slab 80 controls the amount of spreading in the vertical direction or along other undesirable axes with a pair of walls 87A and 87B. To further limit such spreading, the slab 80 may have a height equal or similar to the diameter of the portions of waveguides terminating thereat. More particularly, an interferometer indicated generally at 82 has suitably sized waveguide arms 84 and 86 that are fabricated in the same block 55 as the slab or region 80 that provides output optics functionality. The region 80 may be fabricated as a three-dimensional slab of relative index change via femtosecond writing techniques similar to those used to fabricate the waveguides. Alternatively, the region 80 may constitute a different material inserted into a cutout section of the block 55. In that case, the section of the block 55 may be removed (or cut out) in any one of a number of ways, including through ablation or through laser-induced anisotropic chemical etching processes.

Figure 4A:
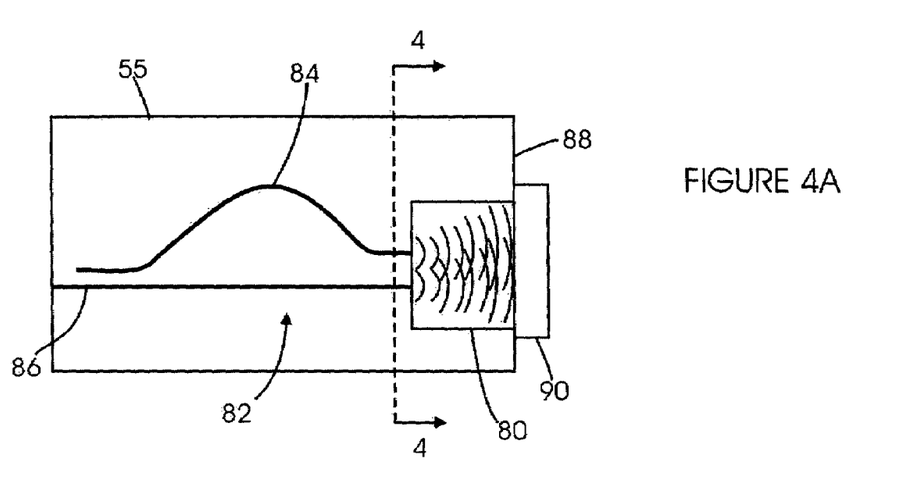
FIG. 4A is a schematic illustration of an alternative Young's interferometer of the photonic device of FIG. 2.
Figure 4B:
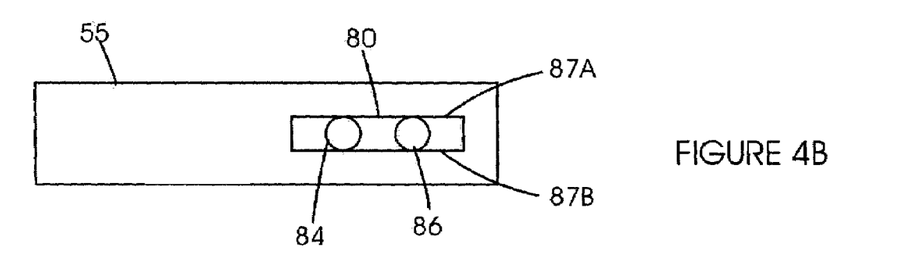
FIG. 4B is a cross-sectional, schematic view of the Young's interferometer of FIG. 4A taken along the lines 4-4.

Incorporation of the slab 80 generally provides for projection of the interference pattern on a surface or side 88 of the block. A detector 90 may then be disposed right at the surface 88. The detector 90 is configured for attachment or other disposition close to the block 55 so as to avoid free space propagation of the interference signals exiting the waveguides 84 and 86. In these ways, use of the disclosed device or system in the field avoids exposure to the ambient or other environmental factors otherwise encountered in free space propagation. Furthermore, such integration of the output optics, detector and interferometric components of the disclosed system avoids alignment problems that might arise through vibration or other movement during use. In other words, certain applications may present the possibility of undesirable displacement of one or more system components and/or contamination by debris or other particulate matter disposed in between the interferometer and detector devices.

To further the degree of integration, the system may also include a lens or other output optics (not shown) attached, affixed, or otherwise fabricated in the block 55, or alternatively, at the surface 88 of the block. When in the block 55, such output optics may be fabricated via ablation, anisotropic chemical etching, or other laser-based processes.

Figure 5A:
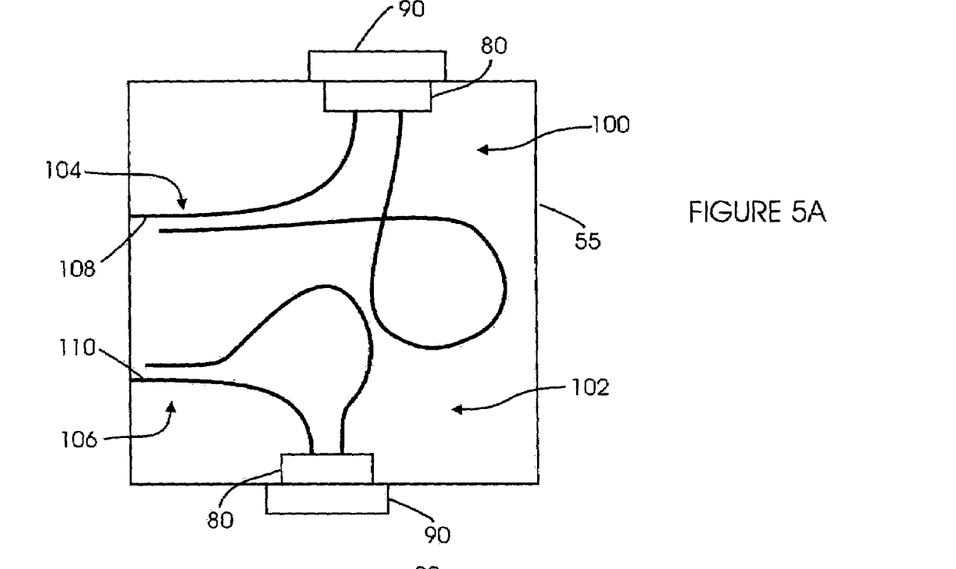
FIGS. 5A and 5B are schematic illustrations of interferometer arrays of the photonic device of FIG. 2 in accordance with further embodiments.
Figure 5B:
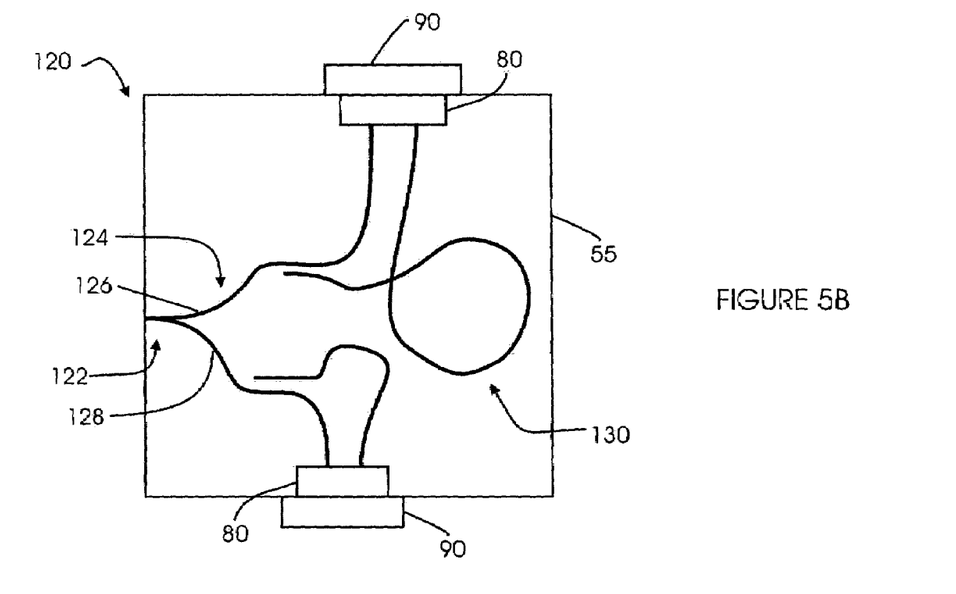

Further degrees and manners of integration of the photonic devices are shown in FIGS. 5A and 5B. In each case, multiple interferometers are fabricated in the same glass block or substrate 55. More particularly, in FIG. 5A, two interferometers indicated generally at 100 and 102 are integrated for use in an interferometric array, which may include any number of interferometers (only two are shown here solely for the sake of convenience in illustration). In FIG. 5A, each interferometer 100, 102 has a dedicated, separate substrate input section indicated generally at 104 and 106, respectively. In this embodiment, an upstream component(s) has divided the received signal and distributed it to waveguides 108, 110 of the two input sections 104, 106, respectively. In one example of a device or system in accordance with this embodiment, each interferometer in the array (or equivalently, each temporal length bracket or bin) has its own dedicated substrate input section separated by at least about 30-40 microns from an adjacent input section. The separation may, in fact, be much greater (e.g., 4 mm) in the interest of accommodating optics components, such as a lens. The glass block may be about 3.0 inches wide and deep, and about 2 millimeters in height.

In contrast, FIG. 5B shows an interferometric device indicated generally at 120 having a single input section indicated generally at 122 and a demultiplexer (or splitter) indicated generally at 124 integrated into the same block. The integrated demultiplexer 124 may be similar to the splitters of each individual interferometer and, as such, take any one of a number of conventional forms (Y-junction, MMI, evanescent coupling, etc.). Two waveguides 126 and 128 then distribute the divided signal to an interferometer array indicated generally at 130.

The interferometers 100 and 102 of FIG. 5A, as well as the interferometers of the array 130, may generally take the form of any of the interferometers described and shown in connection with FIGS. 3A, 3B, 4A and 4B. Certain elements common to these prior figures are identified in FIGS. 5A and 5B with like reference numerals. In summary, and generally speaking, each such interferometer has an input section, time delay section and an output section for generating an interference pattern on a detector. As shown in FIGS. 5A and 5B, such interferometers may include further integrated components for focusing and generating the interference within the block to thereby project the interference pattern on the surface of the block. The detector may then be disposed right at that surface.

The disclosed device and system may have any number of inputs or accommodate a demultiplexer with any number of outputs.

The disclosed device and system may incorporate a collecting input unit (not shown), such as a fiber or focusing lens, that has optical properties comparable with that of the input waveguide (e.g., roughly the same numerical aperture). In such cases, the collecting input unit generally couples light into a waveguide written in the substrate 55 that may in turn act as the substrate input section upstream of the interferometers. Either the fiber or lens may be affixed to the substrate 55 via epoxy or other techniques known to those skilled in the art. A V-groove (not shown) or some other feature may be machined in the substrate 55 to position the lens or fiber with respect to the waveguide. In any event, the function of this unit is to optimize the device throughput (or optical efficiency). This unit may have additional functions such as filtering or providing protection from unwanted signals. The unit is followed by an optical waveguide of the appropriate shape, which it is designed to accommodate.

As shown in FIGS. 5A and 5B, the outputs are distributed around multiple sides or surfaces of the substrate or block 55 for spatial separation. Another reason for such distribution is shown in connection with both embodiments in the sense that the outputs are not directly in line with the inputs (i.e., such that a straight waveguide does not connect any one input and output). Instead, each interferometer path includes at least one curved section of waveguide. This misalignment between input and output may be desirable if it is difficult to couple 100% of the incoming optical signal into the input section of an interferometer, in which case some light may proceed through the bulk of the glass block and be detected by the detector. Such uncoupled input signal would otherwise distort the interference pattern.

In an alternative embodiment, incoming light may be injected into an input waveguide that was fabricated at an angle from the direction of propagation for the incoming light. The injection angle should be selected to avoid any flux not coupled into the waveguide to possibly be present at the output.

The misalignment may be accomplished in ways other than bends within the plane shown in FIG. 5A or FIG. 5B. In one embodiment, the input and output are misaligned in the vertical direction. As with the foregoing embodiments, such misalignment may be effected via a non-straight waveguide section or via a waveguide section fabricated at a non-zero angle from the initial propagation direction.

Use of the disclosed embodiments is not limited to single-mode applications. The waveguides and other components described or identified herein have been shown to propagate either single-mode or multimode signals, thereby generating useful interference patters in both cases. With single-mode waveguides, the clarity of the optical signals may benefit from spatial filtering, especially in the areas associated with the splitters. Such filtering may be important to improve the signal-to-noise ratio of the device or system, which is further enhanced by the integration of the waveguides and other components in the substrate or block. That is, when compared to fiber transmission, such integrated waveguides have the surrounding the substrate to dissipate any spurious signals, such as higher-order propagation modes. In one example, the substrate may provide a few millimeters in the vertical direction and an effective infinite distance in the horizontal directions. As a result, flux radiating out of the waveguide is quickly dissipated, and any reflection at the air/glass interface occurs too far from the waveguide. In contrast, a standard single-mode fiber has a cladding diameter of 125 microns, and can experience disturbances due to reflected flux.

Portions of the waveguides described or identified above may alternatively involve optical fibers or free space transmission using optics and other structures known to those skilled in the art to direct the optical signals accordingly.

In alternative embodiments, the output sections of the interferometer array may be stacked or arranged in the vertical direction, such that two or more outputs are disposed on the same side or surface of the substrate or block 55. For example, the interference patterns may be arranged vertically rather than horizontally about the substrate. Optics may then be used to help avoid any comingling of the interference patters from adjacent interferometers in the integrated interferometer stack.

The detector 22 may be linear or two-dimensional. The use of linear detectors may be advantageous if the outputs are on the same side or surface of the block 55 (either horizontally, vertically or otherwise), as described above in connection with an integrated interferometer stack. Such detectors may also be desirable in simplifying the intensity data of each interference pattern. A lens and/or other optics may be necessary to direct (i.e., focus along one line) the interference patterns 20 in the event that a linear detector is used.

Generally speaking, operation of the disclosed device and system relies upon low loss transmission of the incoming signals throughout the photonic device. The degree to which a portion of the photonic device provides for low losses depends upon a number of parameters, not the least of which are wavelength and the curvature of the waveguide. In certain circumstances (e.g., certain wavelengths), it has been found that modification of the cross-sectional profile of a waveguide may help transmission through a bend or curve. More specifically, the waveguide profile may be widened to improve its guiding characteristics. Alternatively, a segment of modified refractive index may be written near the waveguide during such bends or curves, and/or slightly before and/or after such bends or curves.

In general, any waveguide writing methods and techniques known to those skilled in the art and/or disclosed in the aforementioned patent applications may be applied to improve throughput and lower losses. To further improve signal strength, the edges of the substrate 55 may be angled, de-polished, or ground to reduce unwanted reflection at the surfaces, such as at the inputs.

Use of the disclosed device and system is not limited to received optical signals of any particular wavelength. For example, one embodiment may operate over a wide range of wavelengths, such as about 600 nm through about 1550 nm. In other words, the waveguides and other components of the device and system are capable of propagation of the received signal and any other intermediate optical signals at wavelengths within such range. To improve throughput (i.e., for lower loss transmission throughout the device), the glass block or substrate may be annealed for approximately 24 hours at 200 degrees Celsius after the waveguides and other structures have been written. Such processing may improve throughput for applications involving short wavelengths.

The output optics modules 40 or the lens 62 may not be necessary in certain cases. For example, the lens 62 may be replaced with one or more mirrors for direction of the exiting beams and, correspondingly, the interference pattern. In other cases, the lens may simply be removed.

The demultiplexer 34 may also not be necessary in certain cases. For example, the incoming signal may have already been split or is otherwise ready for processing by device.

To help calibrate or otherwise prepare the disclosed devices and systems for operation, one or more calibration devices may be incorporated therein. In some embodiments, a calibration waveguide may be integrated into the same block or substrate 55 having one, more or all of the interferometric devices. The calibration waveguide may couple out of a interferometer arm a portion of the flux through a Y-junction, evanescent coupling or other known technique, for transmission to a detector for analysis. In general, calibration or other pre-operation devices may be incorporated to measure the input power, polarization, wavelength, or other characteristic, of the received signal independently of the interferometric measurements, as well as to detect the arrival of pulses. Such other measurements or operations may involve sending some of the received signal to another, non-integrated set of devices.

The manner in which an interferogram (i.e., recordation of an optical interference pattern) generated via the disclosed device and method may be useful is shown via the following theoretical expressions. More particularly, set forth below are the theoretical expressions for the near field and far field diffraction patterns for the output of a single interferometer as described above. To this end, we need to derive the transmittance function, $t_a(\zeta,\eta)$ for two circular output apertures separated horizontally by a distance $\Delta$. This expression can be written as follows $$t_a(\xi, \eta) = \left(\frac{2\rho}{D}\right) \otimes \left[A_1(\xi, \eta, z, t) \cdot \delta\left(\xi - \frac{\Delta}{2}\right) + A_2(\xi, \eta, z, t) \cdot \delta\left(\xi + \frac{\Delta}{2}\right)\right], \quad (1)$$

where D is the diameter of the waveguide, $A_1$ and $A_2$ represent the two Gaussian field amplitudes at the output, and the waveguide separation is $\Delta=50$ μm. Note: here the $\hat{x}$ symbol represents a convolution operation and $\rho$ is the radial coordinate in the aperture plane given by $\rho=\sqrt{\zeta^2+\eta^2}$.

Since the transmittance $T_x$ through each of the waveguides may differ and $A_1$ and $A_2$ are temporally delayed relative to one another, an interference pattern will form only when the time delay between the pulses is less than the coherence length ($\tau_c$) of the incoming pulse. Therefore to model the system correctly, the two fields must be treated individually. Assuming the physical dimensions of each waveguide are the same, the general Gaussian distribution for each field is given by $$A_1(\xi, \eta, z, t) = T_1 A_o \cdot \exp\left[-\left(\frac{\xi^2 + \eta^2}{\omega_0^2}\right)\right] \cdot \exp\left[-2\ln 2\left(\frac{t}{t_p}\right)^2\right] \cdot \exp[-ikz], \quad (2a)$$

$$A_2(\xi, \eta, z, t + \tau_{OPD}) = \\ T_2 A_o \cdot \exp\left[-\left(\frac{\xi^2 + \eta^2}{\omega_0^2}\right)\right] \cdot \exp\left[-2\ln 2\left(\frac{t + \tau_{OPD}}{t_p}\right)^2\right] \cdot \exp[-ikz]. \quad (2b)$$

Here $\tau_{OPD}$ is the time delay resulting from the optical path difference (OPD) between the two channels, $\omega_o$, is the waist of the TEM$_{00}$ waveguide mode, $A_o$ is the field amplitude, $t_p$ is the pulse width, and $k=2\pi/\lambda$ is the wavenumber. The Fresnel diffraction pattern then becomes $$\underline{A}(x, y, z, t_x) = \quad (3)$$

$$\frac{e^{ikz}}{i\lambda z} \exp \frac{ik}{2z}(x^2+y^2) \cdot \int_{-\infty}^{\infty}\int_{-\infty}^{\infty}\left\{t_a(\xi, \eta) \cdot e^{i\frac{k}{2z}(\xi^2+\eta^2)}\right\} \cdot e^{\frac{-i2\pi}{\lambda z}} d\xi d\eta,$$

where $$e^{i\frac{k}{2z}(\xi^2 + \eta^2)}$$

is the Fresnel phase term and $$e^{\frac{-i2\pi}{\lambda z}(x\xi + y\eta)}$$

is the Fourier Transform term.

Evaluating numerically the Fresnel integral above can prove difficult even using software packages such as Matlab or other similar packages. Fortunately we can simply the problem considerably by assuming that the observation plane is in the far-field or Fraunhoffer region (i.e. $z \ll D^2/\lambda$). Provided this condition is satisfied, the Fresnel phase term reduces to 1 and the integral then becomes just the Fourier transform of the transmittance aperture which can be written as $$U(r, z, t) = \Im\{t_a(\xi, \eta)\} = \quad (4)$$

$$\frac{e^{ikz}}{i\lambda z} e^{i\frac{k}{2z}(x^2+y^2)} \cdot \left\{\frac{D}{2} \cdot \frac{2J_1(\pi Dr/\lambda z)}{\pi Dr/\lambda z} \cdot [A_1 e^{i\pi x\Delta/\lambda z} + A_2 e^{-i\pi x\Delta/\lambda z}]\right\}.$$

Here $J_1$ is the first order Bessel function and r is the radial coordinate in the detector plane given by $r=\sqrt{x^2+y^2}$. Subsequently the intensity pattern at the detector $I_D$ for a monochromatic source is given by $$I_D(r, z, t) = |U(r, z, t)|^2 = \quad (5)$$

$$\left\{\frac{D}{\lambda z} \cdot \frac{J_1(\pi Dr/\lambda z)}{\pi Dr/\lambda z}\right\}^2 \cdot |A_1(r, t)e^{i\pi x\Delta/\lambda z} + A_2(r, t+\tau_{OPD})e^{-i\pi x\Delta/\lambda z}|^2.$$

Assuming that the difference in transmission over the OPD between the two channels is small and that $\tau_{OPD} \leq \tau_c$, the field magnitudes are approximately equal (i.e. $A_1 \approx A_2 = A$) and Eq. 5 reduces to, $$I_D(r, z, t) = \quad (6)$$

$$|U(r, z, t)|^2 = \left\{\frac{D}{\lambda z} \cdot \frac{J_1(\pi Dr/\lambda z)}{\pi Dr/\lambda z}\right\}^2 \cdot |A(r, t)e^{i\pi x\Delta/\lambda z} + A(r, t)e^{-i\pi x\Delta/\lambda z}|^2.$$

By applying some rather straightforward trigonometric manipulation, this equation can be further be simplified to the standard formula found in the classic Young's Double Slit experiment $$I_D(r, z, t) = \left\{\frac{2D}{\lambda z} \cdot \frac{J_1(\pi Dr/\lambda z)}{\pi Dr/\lambda z}\right\}^2 \cdot [1 + \cos(\pi x\Delta/\lambda z)] \cdot |A(r, t)|^2. \quad (7)$$

Up until now, we have proceeded under the assumption that both fields emerging from the waveguide originated from a single monochromatic source. In actuality, this assumption is rarely valid. For most real world applications, the illumination source generally is quasi-monochromatic (i.e., not fully monochromatic), containing several different wavelengths (i.e., a certain bandwidth). The propagation time for each wavelength within the waveguide then differs and arrives at the detector at different times. With portions of the spectral bandwidth delayed slightly, the resulting image becomes a superposition of each field. Due to the changes in wavelength the modulation period will vary and as a result, the detected image becomes blurred. This effect can be modeled mathematically by assuming the detector integration time is infinite relative to the sequential pulse delay $\tau_\lambda$ across the spectral bandwidth. The detector response can then be written as the time average the field at the center frequency of the pulse plus a shifted version of itself. Therefore we can rewrite Eq. 7 as $$I_D(t) = C_1 \cdot \langle |A(t) + A_(t+\tau_\lambda)|^2 \rangle, \tag{8a}$$

where $C_1$ is the collection of constants given by $$C_1 = \left\{ \frac{2D}{\lambda z} \cdot \frac{J_1(\pi Dr/\lambda z)}{\pi Dr/\lambda z} \right\}^2 \cdot [1 + \cos(\pi x \Delta/\lambda z)]. \tag{8b}$$

Note: both the r and z dependence on $I_D$ have been dropped for simplicity. Expanding this expression, we find $$I_D(t) = C_1 \{ \langle |A(t)|^2 \rangle + \langle |A_(t+\tau_\lambda)|^2 \rangle + \langle A^*(t)A(t+\tau_\lambda) \rangle + \langle A(t) A^*(t+\tau_\lambda) \rangle \}. \tag{9}$$

From Eq. 9 we find that the first two terms essentially account for the magnitude of the two fields emerging from the waveguide and the second two correspond to the autocorrelation of the two fields. Due to the frequency in which these statistical properties appear in other applications, special symbols have been adopted to simplify the expressions and make them more manageable. Employing the following notation for the field magnitude $I_o$ of the intensity profiles $$I_o \triangleq \langle |A(t)|^2 \rangle = \langle |A(t+\tau_\lambda)|^2 \rangle, \tag{10a}$$

and letting $\Gamma(\tau_\lambda)$ denote the autocorrelation function (a.k.a. the self coherence function) of the analytic signal, $$\Gamma(\tau_\lambda) = \langle A(t+\tau_\lambda) A^*(t) \rangle, \tag{10b}$$

Eq. 9 reduces to $$I_D(t) = C_1 \cdot \{ 2I_o + \Gamma(\tau_\lambda) \Gamma^*(\tau_\lambda) \}. \tag{11}$$

Equation 11 is now the measure of the autocorrelation of one pulse with a delayed version of itself. It is often, however, easier to work with a normalized version of the self coherence function $\gamma(\tau_\lambda)$ which is known as the complex degree of coherence $$\gamma(\tau_\lambda) = \frac{\Gamma(\tau_\lambda)}{\Gamma(0)} = \frac{\Gamma(\tau_\lambda)}{I_o}. \tag{12}$$

Substituting Eq. 12 into Eq. 11 yields $$I_D(t) = C_1 \cdot \{ 2I_o + I_o \gamma(\tau_\lambda) + I_o \gamma^*(\tau_\lambda) \}. \tag{13}$$

Consequently we have arrived at an expression for the interferogram on the detector that is directly related to the complex coherence function $\gamma(\tau_\lambda)$ associated with the illumination beam. For a Gaussian spectral distribution, the relationship between this coherence function and the power spectral density of a real valued optical disturbance is well defined[5]

$$\gamma(\tau_\lambda) = \int_0^\infty \left\{ \frac{2\sqrt{\ln 2}}{\sqrt{\pi} \delta v} \exp\left[ -\left( 2\sqrt{\ln 2} \frac{v - v_o}{\delta v} \right)^2 \right] \right\} \cdot e^{-i 2\pi v \tau_\lambda} \, dv, \tag{14}$$

where $\delta v = c \delta \lambda / \lambda_o^2$ is half-power bandwidth of the source, $v = 2\pi c/\lambda$ is the angular frequency of the shifted optical signal, and $v_o$ is the center frequency. Upon closer inspection, we find Eq. 12 is simply the Fourier transform of the original Gaussian distribution. Thus by simple inverse transformation $$\gamma(\tau_\lambda) = \exp\left[ -\left( \frac{\pi \delta v \tau_\lambda}{2\sqrt{\ln 2}} \right)^2 \right] \cdot \exp[-i 2\pi v_o \tau_\lambda]. \tag{15}$$

By substituting Eq. 15 back into Eq. 13, the expression for the intensity on the detector then becomes $$I_D(t) = \tag{16}$$

$$I_o C_1 \cdot \left\{ 2 + \exp\left[ -\left( \frac{\pi \delta v \tau_\lambda}{2\sqrt{\ln 2}} \right)^2 \right] \cdot (\exp[-i 2\pi v_o \tau_\lambda] + \exp[-i 2\pi v_o \tau_\lambda]) \right\}.$$

Again applying the trigonometric manipulation used earlier and substituting $\tau_\lambda = 2\pi n_g \delta \lambda/c$ for the optical path delay across the pulse bandwidth, this equation further simplifies to $$I_D(r, z) = 2I_o \cdot \left\{ \frac{2D}{\lambda z} \cdot \frac{J_1(\pi Dr/\lambda z)}{\pi Dr/\lambda z} \right\}^2 \cdot [1 + \cos(\pi x \Delta/\lambda z)]. \tag{17a}$$

$$\left\{ 1 + \exp\left[ -\left( \frac{\pi^2 \delta \lambda^2 n_g}{\lambda_o^2 \sqrt{\ln 2}} \right)^2 \right] \cdot \cos\left[ \frac{4\pi^2 n_g \delta \lambda}{\lambda_o} \right] \right\},$$

where $$I_o = \left| A_o T \cdot \exp\left[ -\left( \frac{r}{w_0} \right)^2 \right] \exp\left[ -2\ln 2 \left( \frac{t}{t_p} \right)^2 \right] \right|. \tag{17b}$$

At last we find that the shape of the interferogram is dependent not only on the shape of the diffracting aperture and the parameters of the $TEM_{00}$ Gaussian waveguide mode, but the spectral bandwidth of the illumination source. This additive modulation subsequently blurs the image as it reduces the fringe visibility. Furthermore, it is dependent only on the center wavelength, the index of the glass, and the overall bandwidth of the source. As a result, the basic fringe period set by the waveguide separation remains unchanged and only the visibility is affected. Also note that when the source becomes more monochromatic though, the exponential term and the cosine term both approach zero and the additional fringe modulation disappears. Also upon normalization this causes the above equation to reduce to Eq. 17.

Figure 6:
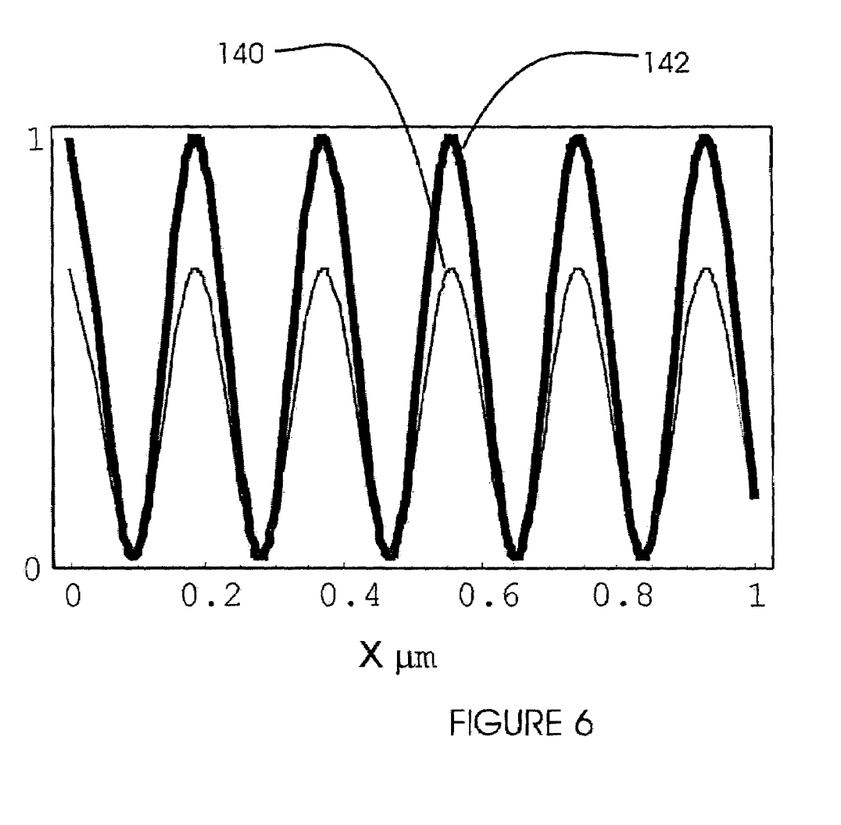
FIG. 6 is a plot of fringe visibility for a single monochromatic source (red line) and an extended source (blue line) with an additional 15 nm spectral bandwidth in accordance with a theoretical simulation of the disclosed autocorrelation technique.

For confirmation purposes, this detrimental effect on the fringe modulation can be investigated by employing the aid of the Mathematica software package. Looking only at the two cosine terms and letting $\Delta=50$ μm, $\lambda_o=775$ nm, $n_g=1.55$, $z=6$ mm, and $\delta\lambda=15$ nm, the resulting fringe pattern can be plotted as in FIG. 6 below. As shown in FIG. 6, a fringe pattern 140 results from the additional bandwidth, which corresponds with a decrease in fringe visibility of about 30% from that of a single monochromatic source, as shown by a fringe pattern 142.

The foregoing description relates to but a few of the embodiments incorporating aspects of the development. Those of ordinary skill in the relevant art will recognize other beneficial applications of these and other related embodiments. Any of the disclosed components, devices, aspects or other portions of an embodiment could be combined with matters known to those skilled in the art and in the interest of yet further applications and uses.

We claim:

1. An optical pulse correlation system for analyzing an optical signal pulse, comprising:
    a glass substrate with an interior bulk;
    an interferometer array of interferometric elements wherein each interferometric element of the interferometer array includes a waveguide that introduces a respective time delay for autocorrelation of the optical signal pulse, each interferometric element being disposed within the interior bulk of the glass substrate;
    a plurality of detectors in optical communication with the interferometer array to receive one or more interference patterns generated by the interferometer array; and
    an analyzer coupled to the plurality of detectors to determine temporal coherence length information for the optical signal pulse based on the received interference patterns wherein the temporal coherence length information determined by the analyzer comprises data that brackets the temporal coherence length of the optical signal pulse based on two interferometric elements of the interferometer array having time delays near the temporal coherence length of the optical signal pulse.

2. The optical pulse correlation system of claim 1, wherein the time delay of at least one of the interferometric elements is introduced by a three-dimensional waveguide path disposed in the interior bulk of the glass substrate.

3. The optical pulse correlation system of claim 1, wherein the interior bulk of the glass substrate comprises a monolithic block of fused silica within which each interferometric element of the interferometer array is disposed.

4. The optical pulse correlation system of claim 1, further comprising a demultiplexer that distributes the optical signal pulse to each interferometric element of the interferometer array.

5. The optical pulse correlation system of claim 4, wherein the demultiplexer and each interferometric element of the interferometer array is integrated and disposed in the glass substrate.

6. The optical pulse correlation system of claim 5, further comprising a controller that generates a control signal for the demultiplexer to allocate power associated with the optical signal pulse to one or more interferometric elements.

7. The optical pulse correlation system of claim 1, further comprising a plurality of output optics modules for the interferometer array, wherein each output optics module is integrated and paired with a respective interferometric element of the interferometer array integrated within the glass substrate, such that the interference patterns are generated at or near a surface of the glass substrate.

8. The optical pulse correlation system of claim 7, wherein each output optics module comprises a three-dimensional region that has a height approximately equal to a cross-sectional dimension of a waveguide portion of the respective interferometric element terminating at the three-dimensional region.

9. The optical device of claim 7, wherein each output optics module comprises a three-dimensional portion of the glass substrate having a modified refractive index.

10. An optical pulse correlation system for analyzing an optical signal pulse, comprising:
    a glass substrate with an interior bulk;
    an interferometer array of interferometric elements wherein each interferometric element of the interferometer array includes a waveguide that introduces a respective time delay for autocorrelation of the optical signal pulse, each interferometric element being disposed within the interior bulk of the glass substrate;
    a plurality of detectors in optical communication with the interferometer array to receive one or more interference patterns generated by the interferometer array; and
    an analyzer coupled to the plurality of detectors to determine temporal coherence length information for the optical signal pulse based on the received interference patterns wherein the analyzer further determines temporal pulse length information when the optical signal pulse is Fourier-transform limited.

11. A method of determining information related to an optical signal pulse, the method comprising the steps of:
    distributing the optical signal pulse to a plurality of interferometric devices, each of which is disposed within an interior bulk of a glass substrate and has a pair of waveguide arms that introduces a respective delay via a predetermined, respective path length difference between the pair of waveguide arms; and
    analyzing one or more interference patterns generated by the plurality of interferometric devices to determine the optical signal pulse information wherein the analyzing step comprises the step of determining whether each interferometric device of the plurality of interferometric devices generates an interference pattern to bracket a temporal coherence length of the optical signal pulse.

12. A method of determining information related to an optical signal pulse, the method comprising the steps of:
    distributing the optical signal pulse to a plurality of interferometric devices, each of which is disposed within an interior bulk of a glass substrate and has a pair of waveguide arms that introduces a respective delay via a predetermined, respective path length difference between the pair of waveguide arms; and
    analyzing one or more interference patterns generated by the plurality of interferometric devices to determine the optical signal pulse information wherein the analyzing step comprises the step of processing one or more interference patterns using an autocorrelation algorithm such that the information comprises data related to a temporal coherence length of the optical signal pulse.

13. The method of claim 11, wherein the interior bulk of the glass substrate comprises a monolithic block of fused silica within which each interferometric device of the plurality of interferometric devices is disposed.

14. The method of claim 11, wherein the distributing step comprises the step of splitting the optical signal pulse using waveguide structures disposed in the glass substrate and integrated with the plurality of interferometric devices.

15. The method of claim 14, wherein the splitting step comprises the step of controlling a power distribution of the optical signal pulse.

16. The method of claim 11, wherein the analyzing step comprises the step of detecting one or more interference patterns using a plurality of detectors disposed on one or more surfaces of the glass substrate.

17. The method of claim 11, further comprising the step of detecting an arrival of the optical signal pulse.

18. The method of claim 11, wherein the analyzing step comprises the step of processing one or more interference patterns to generate data indicative of a central wavelength of the optical signal pulse.

19. An optical signal pulse analysis method comprising the steps of:
   distributing an optical signal pulse to a plurality of unbalanced interferometric devices, each of which has a respective fixed path length difference; and
   detecting generation of an interference pattern by a first interferometric device of the plurality of unbalanced interferometric devices in response to the optical signal pulse;
   detecting a lack of interference pattern generation by a second interferometric device of the plurality of unbalanced interferometric devices in response to the optical signal pulse; and
   determining a lower bound and an upper bound for a parameter of the optical signal pulse based on the respective fixed path length differences of the first and second interferometric devices, respectively.

20. The optical signal pulse analysis method of claim 19, wherein the upper and lower bounds define a range of possible temporal coherence lengths of the optical signal pulse.

21. The optical signal pulse analysis method of claim 19, further comprising the step of extracting bandwidth information for the optical signal pulse based on an analysis of the detected interference pattern.

22. The optical signal pulse analysis method of claim 19, further comprising the step of extracting wavelength information for the optical signal pulse based on an analysis of the detected interference pattern.

23. The optical signal pulse analysis method of claim 19, wherein the distributing step comprises the step of modifying an allocation of the optical signal pulse after an initial equal distribution of the optical signal pulse across the plurality of unbalanced interferometric devices, the allocation highlighting a subset of the plurality of unbalanced interferometric devices better suited for determination of the lower and upper bounds for the parameter of the optical signal pulse.

24. The optical signal pulse analysis method of claim 19, wherein each interferometric device of the plurality of unbalanced interferometric devices is disposed within an interior bulk of a glass substrate.

25. The optical signal pulse analysis method of claim 24, wherein the interior bulk of the glass substrate comprises a monolithic block of fused silica within which each interferometric device of the plurality of interferometric devices is disposed.

* * * * *